United States Patent [19]

Komai et al.

[11] Patent Number: 4,533,699

[45] Date of Patent: Aug. 6, 1985

[54] COPOLYMERIZED UNSATURATED PEROXYCARBONATE SIZING AGENT FOR TREATMENT OF GLASS FIBERS AND METHOD FOR TREATMENT OF GLASS FIBERS WITH SAID SIZING AGENT

[75] Inventors: Takeshi Komai, Aichi; Kazuo Matsuyama, Gamagori; Takuya Saigo, Aichi, all of Japan

[73] Assignee: Nippon Oil & Fats Co., Ltd., Tokyo, Japan

[21] Appl. No.: 615,211

[22] Filed: May 30, 1984

[30] Foreign Application Priority Data

May 30, 1983 [JP] Japan .................................. 58-93981

[51] Int. Cl.$^3$ ....................... C08F 230/08; B05D 3/02
[52] U.S. Cl. ..................................... 525/277; 526/279; 427/389.7
[58] Field of Search ................ 526/314, 279; 525/277, 525/342, 273, 288; 427/389.7

[56] References Cited

U.S. PATENT DOCUMENTS 4,097,436  6/1978  Baning et al. ........................ 526/279

FOREIGN PATENT DOCUMENTS 54-34357  3/1979  Japan ................................... 526/279

OTHER PUBLICATIONS

Chem. Abstract, vol. 95, entry 98892b, 98893c, Tomosauskas et al., Mar. 1981.

*Primary Examiner*—Joseph L. Schofer
*Assistant Examiner*—Peter F. Kulkosky
*Attorney, Agent, or Firm*—Oblon, Fisher, Spivak, McClelland & Maier

[57] ABSTRACT

A sizing agent for the treatment of glass fibers contains as principal components a film-forming agent, which is a copolymer of a specific unsaturated peroxycarbonate and an unsaturated monomer containing at least 70% by weight of vinyl acetate, and a coupling agent. A method for the treatment of glass fibers, which comprises causing said sizing agent to be deposited on glass fibers and subjecting the glass fibers coated with said sizing agent to heat treatment.

17 Claims, No Drawings

COPOLYMERIZED UNSATURATED PEROXYCARBONATE SIZING AGENT FOR TREATMENT OF GLASS FIBERS AND METHOD FOR TREATMENT OF GLASS FIBERS WITH SAID SIZING AGENT

BACKGROUND OF THE INVENTION

This invention relates to a sizing agent for the treatment of glass fibers for plastics and to a method for the treatment of glass fibers by the use of the aforementioned sizing agent. More particularly, this invention relates to a sizing agent for the treatment of glass fibers excelling in ability to bundle glass fibers and in affinity for matrix resin and to a method for the treatment of glass fibers by the use of said sizing agent.

When glass fibers are used for reinforcing plastics, specifically when they are used as reinforcing material for shaped articles of thermosetting resins represented by unsaturated polyester resin or shaped articles of thermoplastic resins, typically by polystyrene, the glass fibers are treated in advance with a sizing agent which is composed of coupling agent, film-forming agent, lubricating agent, etc.

This invention relates to a sizing agent for the treatment of glass fibers, characterized by containing the film-forming agent as described in detail below.

A film-forming agent is an indispensable component for protecting the surface of glass fibers against damage by friction during the manufacturing process of glass fiber products and also for heightening the ability of a sizing agent to bundle glass fibers. When glass fibers are used for the reinforcement of plastics, i.e. in the manufacture of reinforced plastic materials, the film-forming agent forms the primary cause for retarding the impregnation of the matrix resin into the glass fibers.

At present, the polymer and copolymer of vinyl acetate and peracrylic esters are most widely used as film-forming agents. These film-forming agents amply serve to heighten the ability to bundle glass fibers but on the other hand, degrade the affinity of the matrix resin to the glass fibers.

With a view to permitting manufacture of reinforced plastics of high strength able to provide the incompatible properties of ability to bundle glass fibers and affinity between glass fibers and matrix resin, various studies have been made on formulations of sizing agents. For example, Japanese Patent Publication No. SHO 48(1973)-28997 discloses a sizing agent which uses a mixed emulsion of polyvinyl acetate and polystyrene as film-forming agents and consequently imparts glass fibers excellent permeability to the matrix resin. In this case, however since the polymers are by nature deficient in compatibility, they are liable to induce phase separation and consequently fail to produce reinforced plastic materials of high strength. Japanese Patent Application Disclosure No. SHO 53(1978)-17720 discloses that reinforced plastic materials of great strength can be obtained by using a sizing agent containing organic peroxides of high thermal stability. Further Japanese Patent Application Disclosure No. SHO 56(1981)-140048 discloses a method for enhancing the affinity between glass fibers and matrix resin by using organic peroxides in the form of an aqueous emulsion. It has been demonstrated that in these methods highly reactive organic peroxides are liable to inflict damage to the surface of glass fibers, and rigidify and embrittle the coatings because they are locally concentrated on the surface of the glass fibers. This adverse effect arises because a large quantity of organic peroxides are required in consequence of low catalytic efficiency. The aforementioned defect of the sizing agent is not eliminated by the conversion of the organic peroxide into the aqueous emulsion.

The conventional sizing agents have had much room for further improvement as described above.

An object of this invention is to provide a sizing agent for the treatment of glass fibers which has enhanced ability to bundle glass fibers and imparts to the glass fibers ample affinity for the matrix resin.

Another object of this invention is to provide a method for the treatment of glass fibers by the use of the aforementioned sizing agent for the treatment of glass fibers.

SUMMARY OF THE INVENTION

The inventors conducted various studies with a view to accomplishing the objects described above. They have consequently found that glass fibers treated with a sizing agent containing as a film-forming agent a copolymer having vinyl acetate as its principal component and having a peroxycarbonate group dispersed randomly and uniformly therein, when used for reinforcing plastics, exhibit an outstanding bundling property and excel in affinity for the matrix resin, and consequently produce reinforced plastics of great strength. This knowledge has led to completion of the present invention.

Specifically, this invention relates to a sizing agent for the treatment of glass fibers which contains as its principal components a copolymer prepared as a film-forming agent by radically copolymerizing an unsaturated peroxycarbonate represented by the general formula (I):

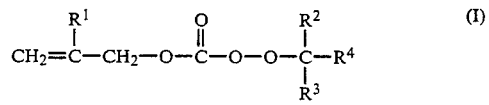

wherein $R^1$ denotes a hydrogen atom or a group selected from the class consisting of alkyl groups of 1 to 4 carbon atoms, $R^2$ and $R^3$ independently denote a group selected from the class consisting of alkyl groups of 1 to 4 carbon atoms, and $R^4$ denotes a group selected from the class consisting of alkyl groups of 1 to 12 carbon atoms and cycloalkyl groups of 3 to 12 carbon atoms and an unsaturated monomer containing at least 70% by weight of vinyl acetate, thereby causing a peroxycarbonate group to be distributed randomly and uniformly in the resultant copolymer and a coupling agent, and to a method for the treatment of glass fibers by the use of the aforementioned sizing agent.

DETAILED DESCRIPTION OF PREFERRED EMBODIMENT

The sizing agent of the present invention is characterized by containing the copolymer serving as the film-forming agent as described above. The detailed description of this invention, therefore, will be started with the copolymer. This copolymer is obtained by subjecting an unsaturated peroxycarbonate to random copolymerization, under conditions which do not cause cleavage of the peroxide bond thereof, with vinyl acetate or a mixture of vinyl acetate and unsaturated monomers. The copolymerization can be effected batchwise or continuously by any of the known radical polymerization techniques such as, for example, bulk polymerization, solution polymerization, emulsion polymerization, or suspension polymerization or even by a method involving intermittent addition of an unsaturated monomer or some other component to the reaction system. This copolymerization is preferably carried out at a temperature in the range of 0° to 110° C., more preferably 10° to 90° C.

When the copolymerization is carried out under the conditions described above, it produces a copolymer having the peroxycarbonate group distributed randomly and uniformly therein because the copolymerizability of the unsaturated peroxycarbonate with vinyl acetate is high.

When vinyl acetate is used in a form containing other unsaturated monomer, the random copolymer produced by the copolymerization may assume an alternate form or a blocked form other than the perfectly random form referred to above, depending on the particular kind of the other monomer.

Concrete examples of the unsaturated peroxycarbonate which is used in the copolymerization of this invention include t-butylperoxy allylcarbonate, t-hexylperoxy allylcarbonate, 1,1,3,3,-tetramethylbutylperoxy allylcarbonate, p-menthaneperoxy allylcarbonate, t-butylperoxy methallylcarbonate, 1,1,3,3,-tetramethylbutylperoxy methallylcarbonate, and p-menthaneperoxy methallylcarbonate. The half-lives at 105° C. which indicate the thermal decomposition property of these unsaturated peroxycarbonates fall in the range of 0.5 to 10 hours.

The unsaturated monomer to be used in the copolymerization of this invention is any known unsaturated compound possessing radical copolymerizability, other than the unsaturated peroxycarbonate represented by the formula (I), and contains at least 70% by weight of vinyl acetate. Concrete examples of the unsaturated monomer except vinyl acetate include vinyl monomers such as ethylene, isobutene, vinyl chloride, vinyl benzoate, vinyl caproate, vinyl butyl ether, vinyl butyl ketone, allyl acetate, allyl chloride, styrene, α-methyl styrene, acrylic acid, acrylic esters, methacrylic esters, vinylidene chloride, and acrylonitrile and polymerizable organic compounds possessing an ethylenic bond such as crotonic acid, maleic anhydride, maleic esters, and fumaric esters. To heighten the bundling property of glass fibers and ensure the random and uniform distribution of the peroxy group, the content of this unsaturated monomer except vinyl acetate must be less than 30% by weight of the total unsaturated monomer content.

The proportion of the unsaturated peroxycarbonate component contained in the random copolymer used as the film-forming agent in this invention (copolymerization ratio of peroxide) depends upon the charging ratio of the respective components used and the copolymerization process. The random copolymer having the desired copolymerization ratio can be obtained when the above mentioned factors are adopted as a parameter of said ratio. If the proportion of the unsaturated peroxycarbonate component is too small, the cross-linking or graft cross-linking reaction cannot be carried out efficiently. If it is too large, the film-forming agent is embrittled. Thus, the amount of the unsaturated peroxycarbonate component is desired to fall in the range of 0.05 to 30% by weight, preferably in the range of 0.5 to 15% by weight.

Now, the coupling agent which is the other essential component aside from the copolymer will be described. As the coupling agent, any of the organic silicon compounds and organic chromium compounds known to the art may be used. The organic silicon compounds are represented by the general formula (II):

wherein $R^5$ denotes an alkenyl group or a functional group-substituted alkyl group, $R^6$ denotes an alkyl group, Y denotes a chlorine atom or an alkoxy group, a denotes 1 or 2, and b denotes 0 or 1, provided that $a+b$ has the value of 1 or 2. Concrete examples of the organic silicon compound include vinyl trimethoxysilane, vinyl triethoxysilane, vinyl tris-(β-methoxyethyoxy)silane vinyl triacetylsilane, γ-methacryloxypropyl trimethoxysilane, vinyl trichlorosilane, N-(β-aminoethyl)-γ-aminopropyl trimethoxysilane, N-(β-aminoethyl)-γ-aminopropyl triethoxysilane, N-(β-aminoethyl)-γ-aminopropylmethyl dimethoxysilane, N-(β-aminoethyl)-γ-aminopropylethyl dimethoxysilane, γ-aminopropyl trimethoxysilane, γ-glycidoxypropyl trimethoxysilane, γ-mercaptopropyl trimethoxysilane, and γ-mercaptopropyl triethoxysilane. Among these organic silicon compounds, those organic silicon compounds which possess a polymerizable double bond capable of readily graft cross-linking prove particularly desirable.

Concrete examples of the organic chromium compound include methacrylate chromic chloride and acrylate chromic chloride.

Either or both of the unsaturated monomer and unsaturated peroxycarbonate constituting the copolymer of the present invention may be in a plural form, and the sizing agent may contain therein a plurality of couplings.

Optionally, the sizing agent of the present invention may additionally contain a cross-linking co-agent, a lubricant, and an antistatic agent as occasion demands.

As the cross-linking co-agent, any known unsaturated compound possessing radical polymerizability may be relied on. Since the sizing agent is used in a treatment which is carried out at elevated temperatures, this cross-linking co-agent is desired to have low volatility, namely a boiling point exceeding 100° C. Concrete examples of the cross-linking co-agent include vinyl monomers such as styrene, vinyl toluene, chlorostyrene, α-methylstyrene, divinylbenzene, acrylic acid, 2-ethylhexyl esters of acrylic acid and methacrylic acid, hydroxyethyl esters, glycidyl esters, diethylene glycol diacrylate, pentaerythritol triacrylate, allyl methacrylate, and diallyl phthalate and polymerizable organic compounds possessing an ethylenic bond such as crotonic acid, maleic anhydride, maleic esters, and fumaric esters.

As the lubricant and the antistatic agent, there may be used any of the compounds known to the art. Concrete examples of the lubricant include the condensate between tetraethylene pentamine and pelargonic acid and partially amidated polyalkylene imine. Concrete examples of the antistatic agent are lauryl trimethyl ammonium chloride and stearyl trimethyl ammonium chloride.

The film-forming agent may be used in the form of solution diluted with organic solvent. From the standpoint of workability, however, it is generally used in the form of an aqueous emulsion. This emulsion can be prepared by the known technique of emulsion polymerization generally in water phase in the presence of known amounts of emulsifier and/or protective colloid. The emulsion thus obtained may be used directly as a component for the sizing agent.

The proportions of the components of the sizing agent, when used in the form of aqueous emulsion, are 0.05 to 12% by weight of the film-forming agent 0.5 to 10% by weight of the coupling agent, 0 to 12% by weight of the cross-linking co-agent, and 0.001 to 1% by weight of the lubricant, preferably 0.2 to 8% by weight, 0.8 to 8% by weight, 0 to 8% by weight, and 0.005 to 0.5% by weight respectively of the aforementioned components, and the balance to make up 100% by weight of water.

The sizing agent containing its components in the aforementioned ranges proves advantageous from the operational and economic points of view in the treatment of glass fibers. When the glass fibers for which this invention is intended are utilized for the reinforcement of plastics, the sizing agent serves advantageously for the maintenance of high ability to bundle glass fibers and high affinity for matrix resin.

The sizing agent of this invention can be effectively used on all types of glass fiber products which are intended for the production of reinforced plastics at all. The glass fibers may be glass strands, glass roving, woven fabric of glass fibers, or non-woven fabric of glass fibers, depending on the nature of the purpose of use.

Plastics for which the glass fibers treated with the sizing agent of this invention are advantageously applied include thermosetting resins such as unsaturated polyester resin and epoxy rein and thermoplastic resins such as styrene resin, acrylic resin, ABS resin, polyethylene, and polypropylene. Among these plastics, the unsaturated polyester resin and the styrene resin prove particularly desirable.

The treatment of glass fibers by the use of the sizing agent of the present invention can be effected by adopting a known method. For example, it is accomplished by depositing the sizing agent on glass fibers by immersion, spraying, or coating technique, wringing and centrifuging the wet glass fibers to remove excess sizing agent optionally predrying the glass fibers, and subsequently maintaining them at temperatures of 100° to 200° C. for a period of about 1 to 12 hours. Since the half-life at 105° C. of the peroxycarbonate contained in the film-forming agent is in the range of 1 to 15 hours, the heat treatment described above causes the greater part of the peorxycarbonate group to be decomposed. Further, the copolymer in the film-forming agent can react efficiently with the coupling agent because the peroxide group is chemically bound thereto. The fragments of peroxycarbonate group which has been decomposed, react with the coupling agent and/or the cross-linking co-agent to induce cross-linking or graft cross-linking reaction and form a strong coating layer on the glass fibers. Optionally, the heat treatment may be carried out under milder conditions so that the greater part of the peroxycarbonate group may be left intact and subsequently utilized in the manufacturing process of reinforced plastics.

To improve the efficiency of the treatment of glass fibers, the amount of the film-forming agent is desired to fall in the range of 0.5 to 15% by weight, preferably in the range of 1 to 3% by weight, based on the glass fibers and that of the coupling agent in the range of 0.5 to 5% by weight, preferably, in the range of 0.1 to 1% by weight, again based on the glass fibers.

Since the sizing agent of this invention contains the film-forming agent which has polyvinyl acetate as its principal component and has the peroxycarbonate group distributed randomly and uniformly therein, it enjoys the following outstanding properties.

(1) It exhibits an outstanding ability to bundle glass fibers because it uses a film-forming agent which consists mainly of polyvinyl acetate. (2) Since the film-forming agent is of such structure as to have the peroxide chemically bound thereto, it efficiently undergoes cross-linking or graft cross-linking reaction with the coupling agent arranged on the surface of glass fibers and gives rise to a strong, uniformly deposited coating layer. Consequently, it precludes the damage to the surface of the glass fibers and enhances the affinity of the glass fibers to the matrix resin. (3) By careful selection of a cross-linking co-agent, the cross-linking or graft cross-linking reaction enhances further the affinity of glass fibers to the matrix resin.

As described above, the sizing agent of the present invention provides both of two normally incompatible properties, i.e. the ability to bundle glass fibers and affinity of glass fibers to the matrix resin. Thus, use of the glass fibers which have been treated with the sizing agent of this invention ensures production of reinforced plastics of great strength.

Now, the production of emulsion of film-forming agents for the sizing agent of this invention will be described with reference to referential examples, the production of sizing agents by the use of the aforementioned emulsions will be described with reference to working examples, the production of sizing agents by the use of emulsions of film-forming agents not conforming to the present invention will be described with reference to comparative experiments, and the treatment of glass fibers by the use of sizing agents of this invention and sizing agents not conforming to the present invention and the production of reinforced plastic materials by the use of such glass fibers will be described with reference to working examples and comparative experiments. It should be noted, however, that this invention is not limited to these examples. (Production of emulsions of film-forming agents)

REFERENCE EXAMPLE 1

In a flask having an inner volume of 500 ml, there was placed 206.7 g of an aqueous solution containing 1.0 g of sodium dodecylsulfate and, then, a 20.0 g portion of 100.0 g of a mixed solution consisting of 4.0 g of t-butylperoxy allylcarbonate and 96.0 g of vinyl acetate as raw materials for the copolymerization was added thereto. Under nitrogen gas, the reactant mixture in the flask was heated. When the temperature of the reactant mixture reached 50° C., one-tenth portions of 13.3 ml of an aqueous solution containing 0.6 g of potassium persulfate and 13.3 ml of an aqueous solution containing 0.6 g of sodium hydrogensulfite were added thereto. Thereafter, the remaining mixed solution of t-butylperoxy allylcarbonate and vinyl acetate, the remaining aqueous solution of potassium persulfate, and the remaining aqueous solution of sodium hydrogensulfite were each added in five equally divided portions at intervals of 30 minutes. After all the solutions had been added, the agitation of the reaction system was continued for one hour. Consequently, there was produced a homogeneous, white emulsion of film-forming agent having a solid content of 30% and a viscosity of 2.4 cps.

This emulsion was added to an aqueous 0.5 mol/l sodium sulfate solution to separate the polymer by salting out. By iodometric analysis, the polymer was found to have an active oxygen content of 0.32%. It was confirmed that this copolymer had t-butylperoxy allylcarbonate component contained in a concentration of 3.5% by weight as randomly and uniformly distributed therein.

REFERENCE EXAMPLES 2

The emulsion copolymerization of Reference Example 1 was repeated, except that 10.0 g of t-butylperoxy allylcarbonate and 90.0 g of vinyl acetate were used instead. Consequently, there was obtained a homogeneous white emulsion of film-forming agent having a solid content of 30% and a viscosity of 2.5 cps. The polymer separated from this emulsion by salting out was found to have an active oxygen content of 0.69%. It was confirmed that the t-butylperoxy allylcarbonate component was contained in a concentration of 7.5% by weight as randomly and uniformly distributed therein.

REFERENCE EXAMPLE 3

In a flask having an inner volume of 500 ml, 7.5 g of polyoxyethylene phosphoric ester alkyl ether was uniformly dissolved in 150.0 g of water and the resultant aqueous solution was neutralized to pH 7 by the addition of an alkali. Then, the aqueous solution was heated to 65° to 70° C. and one-tenth portion of an unsaturated monomer consisting of 119.0 g of vinyl acetate, 12.0 g of butyl acrylate, and 7.0 g of t-butylperoxy allylcarbonate and one-half portion of 0.6 g of ammonium persulfate were added thereto and allowed to undergo initial polymerization. Subsequently, the remaining unsaturated monomer was added dropwise over a period of three hours. In the meantime, the remaining ammonium persulfate was added to complete the polymerization. Consequently, there was obtained a homogeneous, white emulsion of film-forming agent having a solid content of 50% and a viscosity of 3200 cps. When the polymer was separated from the emulsion by following the procedure of Reference Example 1, it was found to have an active oxygen content of 0.41%. It was confirmed that the copolymer contained t-butylperoxy allylcarbonate component in a concentration of 4.5% by weight as randomly and uniformly distributed therein.

REFERENCE EXAMPLE 4

A glass autoclave having an inner volume of 1 liter was charged with 4.0 g polyoxyethylene nonyl phenol, 10.0 g of an aqueous 20% polyvinyl alcohol solution having a saponification value of 75 mol% and a polymerization degree of 500, 2.0 g of sodium carbonate, 2.0 g of potassium persulfate, 200.0 g of water, 90.0 g of vinyl acetate, 5.0 g of isobutene, and 5.0 g of t-butylperoxy allylcarbonate. It was heated to 60° C. and kept at that temperature for two hours, with the rotational speed fixed at 120 rpm. Thereafter, the temperature was raised to 70° C. and kept at that temperature for 3 to 5 hours to complete the polymerization. Consequently, there was obtained a homogeneous, white emulsion of film-forming agent having a solid content of 30%. When the polymer was separated from this emulsion by following the procedure of Reference Example 1, the copolymer was found to have an active oxygen content of 0.39%. It was confirmed that this copolymer contained the t-butylperoxy allylcarbonate component in a concentration of 4.3% by weight in a form randomly and uniformly distributed therein. (Production of sizing agents of this invention)

EXAMPLES 1–5

In a flask having an inner volume of 2 liters, 840.0 g of cold water and 1.0 g of acetic acid were placed and agitated. To the agitated solution, a silane coupling agent shown in Table 1 in the amount indicated in the same table was gradually added. The agitation was continued for about 30 minutes until the added silane coupling agent underwent substantially complete hydrolysis. Partially amidized polyalkylene imine as a lubricant was dissolved in the amount indicated in Table 1 in hot water, diluted with cold water until the temperature thereof fell to 40° C. and then added to the aforementioned flask. Further, an emulsion of film-forming agent obtained in one of Reference Example 1–4 and styrene or diallyl phthalate as a cross-linking co-agent were added in the amounts indicated in Table 1 while under agitation. Finally water was added until the composition of Table 1 was obtained to prepare five sizing agents of differing composition. These were designated as Examples 1–5.

COMPARATIVE EXPERIMENT 1

Emulsion polymerization was carried out by following the procedure of Reference Example 1, except that 100.0 g of vinyl acetate alone was used as the raw material for the copolymerization, to produce an emulsion of polyvinyl acetate having a solid content of 30%. Separately, t-butylperoxy isopropyl carbonate (possessing a half-life of 4.1 hours at 105° C.) having substantially the same thermal decomposition property as t-butylperoxy allylcarbonate was emulsified with polyoxyethylene sorbitan monolaurate, to produce an emulsion of organic peroxide having an oil content of 30%.

A sizing agent was produced by following the procedure of Example 1, except that 96.3 g of the aforementioned emulsion of polyvinyl acetate and 3.7 g of the aforementioned emulsion of organic peroxide were used as an emulsion of film-forming agent. The composition was as shown in Table 1.

COMPARATIVE EXPERIMENT 2

A sizing agent was prepared by following the procedure of Example 2, except that 80.0 g of the same emulsion of polyvinyl acetate as prepared in Comparative Experiment 1 was used in place of the emulsion of film-forming agent of Reference Example 2 and 12.5 g of a commercially available polystyrene emulsion (having a solid content of 40%) was used in place of styrene, and 867.0 g of water was used. The composition was as shown in Table 1.

COMPARATIVE EXPERIMENT 3

A sizing agent was prepared by following the procedure of Example 2, except that 78.2 g of the same emulsion of polyvinyl acetate as produced in Comparative Experiment 1 was used in place of the emulsion of film-forming agent in Reference Example 2 and 1.8 g of t-butylperoxy isopropyl carbonate was used. The composition was as shown in Table 1.

TABLE 1

| Component | | Example 1 | Example 2 | Example 3 | Example 4 | Example 5 | Comparative Experiment 1 | Comparative Experiment 2 | Comparative Experiment 3 |
|---|---|---|---|---|---|---|---|---|---|
| Emulsion of film-forming agent | Reference Example | 1 | 2 | 3 | 3 | 4 | — | — | — |
| | Amount used (g) | 100.0 | 80.0 | 40.0 | 40.0 | 80.0 | 96.3 | 80.0 | 78.2 |
| | Content of peroxide component (g) | 1.1 | 1.8 | 0.9 | 0.9 | 1.0 | 1.1 | 1.8 | 1.8 |
| Lubricant | Partially amidized polyalkylene imine (g) | 0.2 | 0.2 | 0.3 | 0.2 | 0.4 | 0.2 | 0.2 | 0.2 |
| Coupling agent | Vinyl-tris-($\beta$-methoxyethoxy)-silane (g) | 50.0 | 0 | 0 | 30.0 | 40.0 | 50.0 | 0 | 0 |
| | $\gamma$-Methacryloxy-propyl trimethoxysilane (g) | 0 | 40.0 | 20.0 | 0 | 0 | 0 | 40.0 | 40.0 |
| Cross-linking co-agent | Styrene (g) | 0 | 5.0 | 20.0 | 0 | 0 | 0 | (polystyrene) 5.0 | 5.0 |
| | Diallyl phthalate (g) | 0 | 0 | 0 | 10.0 | 0 | 0 | 0 | 0 |
| Water | (g) | 849.0 | 874.0 | 918.0 | 918.0 | 879.0 | 852.0 | 867.0 | 874.0 |

(Manufacture of glass fiber-reinforced plastics)

EXAMPLES 6-8 AND COMPARATIVE EXPERIMENT 4

Glass strands having an outside diameter of 0.16 mm and a length per weight of 14.8 km/kg (made by Nitto Spinning Co., Ltd.) were removed of sizing agent by being passed through a furnace kept at about 300° C. until they acquired a constant weight. The glass strands heat-cleaned were then coated by immersion with the respective sizing agents prepared in Examples 1, 4 and 5 and Comparative Experiment 1, then pre-dried at 50° C. for one hour, and further heated at 120° C. for one hour to form a uniform coating layer on the surface of the glass fibers. Then the glass strands were cut to a length of 24.5 mm to prepare chopped glass strands. The respective samples of glass fibers thus obtained were mixed with an unsaturated polyester to produce composites of the following composition and molded under the following conditions.

| Composition of compound (in parts by weight) | |
|---|---|
| Ortho-phthalic acid type unsaturated polyester | 100 parts |
| Chopped glass strands | 45 parts |
| Inner release agent (zinc stearate) | 2 parts |
| Catalyst (benzoyl peroxide paste) | 2 parts |
| Shape of molded article | |
| Circular plate (400 mm in diameter and 3 mm in thickness) | |
| Molding conditions | |
| Pressure applied | about 28 kg/cm$^2$ |
| Die temperature | Upper die 115° C. and lower die 120° C. |
| Period of pressure application | 3 minutes |

The shaped articles were tested for tensile strength and bending strength. The results of the test were as shown in Table 2 under the headings of Examples 6-8 and Comparative Experiment 4.

TABLE 2

| Plastic shaped article | Physical property | Example 6 | Example 7 | Example 8 | Comparative Experiment 4* |
|---|---|---|---|---|---|
| Unsaturated polyester resin | Tensile strength (kg/mm$^2$) | 9.3 | 9.7 | 9.5 | 7.8 |
| | Bending strength (kg/mm$^2$) | 17.0 | 17.5 | 17.3 | 15.5 |

*Comparative Experiment 4: Product by the method of Japanese Patent Application Disclosure No. SHO 56(1981)-140048.

The results of Table 2 indicate that the shaped articles obtained by the treatment of the method of the present invention exhibit greater strength than the shaped articles of the comparative experiment.

EXAMPLES 9-10 AND COMPARATIVE EXPERIMENTS 5-6

Chopped glass strand samples were obtained by following the procedure of Example 6 except that sizing agents obtained in Examples 2-3 and Comparative Experiments 2-3 were used and the chopped glass strands were obtained in a length of 6 mm. By having the glass fibers dispersed at the ratio of 30% by weight in commercially available styrene resin and then molding the resultant composite, there were obtained shaped articles of glass fiber-reinforced styrene resin. The resultant shaped article were tested for tensile strength at 23° C. and 80° C. in accordance with the method of ASTM D638.

The results of the test are shown in Table 3 under the headings of Examples 9-10 and Comparative Experiments 5-6.

TABLE 3

| Plastic shaped article | Physical property | | Example 9 | Example 10 | Comparative Experiment 5* | Comparative Experiment 6** |
|---|---|---|---|---|---|---|
| Styrene resin | Tensile strength | 23° C. | 10.9 | 11.0 | 8.9 | 9.0 |
| | | 80° C. | 7.8 | 8.0 | 3.7 | 3.9 |

TABLE 3-continued

| Plastic shaped article | Physical property (kg/mm²) | Example 9 | Example 10 | Comparative Experiment 5* | Comparative Experiment 6** |
|---|---|---|---|---|---|

*Comparative Experiment 5: Product by the method of Japanese Patent Publication No. SHO 48(1973)-28997
**Comparative Experiment 6: Product by the method of Japanese Patent Application Disclosure No. SHO 56(1981)-140048.

Example 9 and Comparative Experiment 5 reveals that the shaped article obtained by the treatment with the sizing agent conforming to the present invention possesses greater strength than the shaped article obtained in accordance with the method of Japanese Patent Publication No. SHO 48(1973)-28997. Example 10 and Comparative Experiment 6 reveals that the shaped article obtained by the treatment with the sizing agent conforming to the present invention shows greater strength than the shaped article obtained in accordance with the method of Japanese Patent Application Disclosure No. SHO 56(1981)-140048.

From the description given above, it is noted that the sizing agent for the treatment of glass fibers provided by the present invention possesses better properties than the conventional sizing agents of the same type, that it is easy to produce and it enjoys high economic utility.

What is claimed is:

1. A sizing agent for the treatment of glass fibers, comprising as principal components (1) a copolymer obtained as a film-forming agent, by copolymerizing an unsaturated peroxycarbonate represented by the general formula:

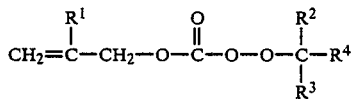

wherein $R^1$ denotes one member selected from the class consisting of a hydrogen atom and alkyl groups of 1 to 4 carbon atoms, $R^2$ and $R^3$ independently denote one member selected from the class consisting of alkyl groups of 1 to 4 carbon atoms, and $R^4$ denotes one member selected from the class consisting of alkyl groups of 1 to 12 carbon atoms and cycloalkyl groups of 3 to 12 carbon atoms, and another unsaturated monomer containing 70 to 100% by weight of vinyl acetate and, (2) a coupling agent selected from the group consisting of organic silicon compounds and organic chromium compounds.

2. A sizing agent for the treatment of glass fibers according to claim 1, wherein said copolymer obtained by said copolymerization is a copolymer emulsion obtained by emulsion polymerization in an aqueous medium.

3. A sizing agent for the treatment of glass fibers according to claim 1, wherein said coupling agent is an organic silicon compound represented by the general formula

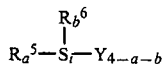

wherein $R^5$ denotes one member selected from the class consisting of alkenyl groups and functional group-substituted alkyl groups, $R^6$ denotes an alkyl group, Y denotes one member selected from the class consisting of a chlorine atom and alkoxy groups, a denotes 1 or 2, and b denotes 0 or 1, provided that a+b has a value of 1 to 2.

4. A sizing agent for the treatment of glass fibers according to claim 3, wherein said organic silicon compound is at least one member selected from the group consisting of vinyl trimethoxysilane, vinyl triethoxysilane, vinyl tris-(2-methoxyethoxy)-silane, vinyl triacetylsilane, 3-methacryloxypropyl trimethoxysilane and vinyl trichlorosilane.

5. A sizing agent for the treatment of glass fibers according to claim 1, wherein said unsaturated peroxycarbonate is at least one member selected from the group consisting of t-butylperoxy allylcarbonate, t-hexylperoxy allylcarbonate, 1,1,3,3-tetramethylbutylperoxy allylcarbonate, p-menthaneperoxy allylcarbonate, t-butylperoxy methallylcarbonate, 1,1,3,3-tetramethylbutylperoxy methallylcarbonate, and p-menthaneperoxy methallylcarbonate.

6. A sizing agent for the treatment of glass fibers according to claim 1 or 2, wherein said another unsaturated monomer consists of 70 to 100% by weight of vinyl acetate and 30 to 0% by weight of a known unsaturated compound capable of undergoing radical copolymerization other than said unsaturated peroxycarbonate.

7. A sizing agent for the treatment of glass fibers according to claim 1, wherein the sizing agent is an aqueous emulsion containing 0.05 to 12% by weight of said film-forming agent and 0.5 to 10% by weight of said coupling agent.

8. A sizing agent for the treatment of glass fibers according to claim 1, wherein the content of said unsaturated peroxycarbonate component in said copolymer is 0.05 to 30% by weight.

9. A method for the treatment of glass fibes, which comprises depositing on said glass fibers a sizing agent having as principal components (1) an emulsion of a copolymer obtained as a film-forming agent, by copolymerizing in an aqueous medium an unsaturated peroxycarbonate represented by the general formula:

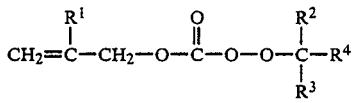

wherein $R^1$ denotes one member selected from the class consisting of a hydrogen atom and alkyl groups of 1 to 4 carbon atoms, $R^2$ and $R^3$ independently denote one member selected from the class consisting of alkyl groups of 1 to 4 carbon atoms, and $R^4$ denotes one member selected from the class consisting of alkyl groups of 1 to 12 carbon atoms and cycloalkyl groups of 3 to 12 carbon atoms, and another unsaturated monomer containing 70 to 100% by weight of vinyl acetate and, (2) a coupling agent selected from the group consisting of organic silicon compounds and organic chromium compounds, and subsequently subjecting the coated glass fibers to a heat treatment.

10. A method for the treatment of glass fibers according to claim 9, wherein said coupling agent is an organic silicon compound represented by the general formula:

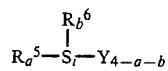

wherein $R^5$ denotes one member selected from the class consisting of alkenyl groups and functional group-substituted alkyl groups, $R^6$ denotes an alkyl group, Y denotes one member selected from the class consisting of a chlorine atom and alkoxy groups, a denotes 1 or 2, and b denotes 0 or 1, provided that a+b has a value of 1 or 2.

11. A method for the treatment of glass fibers according to claim 10, wherein said organic silicon compound is at least one member selected from the group consisting of vinyl trimethoxysilane, vinyl triethoxysilane, vinyl tris-(2-methoxyethoxy)-silane, vinyl triacetylsilane, 3-methacryloxypropyl trimethoxysilane and vinyl trichlorosilane.

12. A method for the treatment of glass fibers according to claim 9, wherein said unsaturated peroxycarbonate is at least one member selected from the group consisting of t-butylperoxy allylcarbonate, t-hexylperoxy allylcarbonate, 1,1,3,3-tetramethylbutylperoxy allylcarbonate, p-menthaneperoxy allylcarbonate, t-butylperoxy methallylcarbonate, 1,1,3,3-tetramethylbutylperoxy methallylcarbonate, and p-menthaneperoxy methallylcarbonate.

13. A method for the treatment of glass fibers according to claim 9, wherein said another unsaturated monomer consists of 70 to 100% by weight of vinyl acetate and 30 to 0% by weight of a known unsaturated compound capable of undergoing radical copolymerization other than said unsaturated peroxycarbonate.

14. A method for the treatment of glass fibers according to claim 9, wherein the sizing agent is an aqueous emulsion containing 0.05 to 12% by weight of said film-forming agent and 0.5 to 10% by weight of said coupling agent.

15. A method for the treatment of glass fibers according to claim 9, wherein the content of said unsaturated peroxycarbonate component in said copolymer is 0.05 to 30% by weight.

16. A method for the treatment of glass fibers according to claim 9, wherein said heat treatment is carried out at a temperature in the range of 100° C. to 200° C. for one to 12 hours.

17. A method for the treatment of glass fibers according to claim 9, wherein said sizing agent contains said film-forming agent in an amount of 0.5 to 15% by weight based on said glass fibers and said coupling agent in an amount of 0.05 to 5% by weight based on said glass fibers.

* * * * *